(12) United States Patent  (10) Patent No.: US 7,519,024 B2
Schlesener et al.  (45) Date of Patent: Apr. 14, 2009

(54) RESOURCE SELECTION IN A COMMUNICATION NETWORK

(75) Inventors: Matthew C Schlesener, Olathe, KS (US); Pallavur Sankaranaraynan, Overland Park, KS (US); Brian D Mauer, Shawnee, KS (US)

(73) Assignee: Sprint Communications Company LP, Overland Park, KS (US)

( * ) Notice: Subject to any disclaimer, the term of this patent is extended or adjusted under 35 U.S.C. 154(b) by 544 days.

(21) Appl. No.: 11/205,806

(22) Filed: Aug. 17, 2005

(65) Prior Publication Data

US 2007/0043863 A1    Feb. 22, 2007

(51) Int. Cl.
*H04Q 7/24* (2006.01)
(52) U.S. Cl. .................................. 370/329; 370/338
(58) Field of Classification Search .................. None
See application file for complete search history.

(56) References Cited

U.S. PATENT DOCUMENTS

2002/0114282 A1    8/2002  MeLampy et al.
2004/0064552 A1*   4/2004  Chong et al. .............. 709/224
2004/0131078 A1    7/2004  Gupta et al.

FOREIGN PATENT DOCUMENTS

GB          2380894        4/2003

OTHER PUBLICATIONS

Furong Wang, et al.; The Extended TRIP for Supporting VoIP Routing Reservation with Distributed QoS; Proceedings of SPIE; Nov. 4-6, 2003; pp. 1015-1024; vol. 5282; Huazhong University of Science and Technology, Wuhan, Hubei, Peoples Republic of China.
Li Rui, et al.; Research on Multi-zone and Hierarchical Routing for Video Gatekeeper Based on Agent; Proceedings of State Laboratory of Information Engineering in Surveying, Mapping and Remote Sensing; Aug. 2005; 6 pages; Wuhan University, Wuhan, Hubei, Peoples Republic of China.
Matthew C. Schlesener, et al.; Performance Evaluation of Telephony Routing over IP (TRIP); IEEE Workshop; Oct. 1-3, 2003; pp. 47-53; Piscataway, New Jersey, USA.

* cited by examiner

*Primary Examiner*—Erika A Gary

(57) ABSTRACT

A communication system comprising an end device, a location server, and a plurality of resources, each resource for providing individual instances of a first application. The end device is configured to transmit a first test message for the first application to a first resource of the plurality of resources using a first access method, receive a first response message from the first resource, process the first response message to determine first performance information for the first application, generate a first update message indicating the first performance information, and transmit the first update message to a location server.

16 Claims, 8 Drawing Sheets

RESOURCE SELECTION IN A COMMUNICATION NETWORK

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The field of the invention relates to telecommunications, and in particular, to the dynamic selection of resources for providing high quality of service applications.

2. Description of the Prior Art

Recent advances in telecommunication technologies have made possible the wide spread use of broadband application services. For example, Internet phone calling, in the form of Voice over Internet Protocol (VoIP) service, has become very popular. In addition, video on demand services and personal data services, as well as other services, have gained widespread acceptance. Along with the spread of broadband services has come the advent of truly mobile broadband experiences, such as EvDO, WiFi, and WiMax.

As these services have become more and more popular, significant challenges have arisen to their provisioning and delivery. One problem in particular relates to the quality of services provided. Namely, carriers and service providers have found it difficult to provide real-time services with reliable levels of quality of service. For example, bandwidth requirements for a service often times cannot be met. As a result, end users experience degraded service quality.

One reason why reliable, high quality services are not yet the norm is that broadband services are currently provisioned and delivered using pre-broadband technologies. For instance, the Domain Name Service (DNS) is used to establish real-time communication sessions between end devices. Typically, DNS allocates applications according to the needs of the applications. For example, DNS will load balance application requests across several application servers running the same application to avoid over extending the resources of any one particular server.

Unfortunately, the needs of the requesting end device, such as a mobile phone, smart, phone, or PDA, are not consider during current service allocation processes. Thus, whether a user is accessing a service through EvDo over a CDMA network, or through WiFi over the public Internet, DNS will set up the session without regard to the current access method. As a result, users experience suboptimal real-time communication sessions. It would be better if both the performance requirements of a session and the performance capabilities of the access method could be considered when provisioning and delivering broadband services.

SUMMARY OF THE INVENTION

An embodiment of the invention helps solve the above problems and other problems by providing systems, methods, and software for determining a preferred resource, or preferred access method, or both, for a particular service or application in order to provision and deliver high quality broadband services. In an embodiment of the invention, a communication system comprises an end device, a location server, and a plurality of resources each for providing individual instances of a first application. The end device is configured to transmit a first test message for the first application to a first resource of the plurality of resources using a first access method, receive a first response message from the first resource, process the first response message to determine first performance information for the first application, generate a first update message indicating the first performance information, and transmit the first update message to the location server.

In an embodiment of the invention, the end device is further configured to transmit a second test message for the first application to a second resource of the plurality of resources using a second access method, receive a second response message from the second resource, process the second response message to determine second performance information for the first application, generate a second update message indicating the second performance information, and transmit the second update message to the location server.

In an embodiment of the invention, the location server is configured to receive the first update message and update a performance table with the first performance information.

In an embodiment of the invention, the location server is configured to receive the second update message and update the performance table with the second performance information.

In an embodiment of the invention, the end device is further configured to transmit an application request indicating the first application to the location server and wherein the location server is configured to receive and process the first application request with the performance table to select a preferred access configuration.

In an embodiment of the invention, selecting the preferred access configuration comprises selecting a preferred resource of the plurality of resources and a preferred access method of the first and second access methods.

In an embodiment of the invention, the first access method comprises code division multiple access (CDMA).

In an embodiment of the invention, the second access method comprises wireless Internet access.

An embodiment of the invention includes a method of operating a communication system, the method comprising transmitting a first test message for a first application using a first access method to a first resource of a plurality of resources each for providing individual instances of a first application, receiving a first response message from the first resource, processing the first response message to determine first performance information for the first application, generating a first update message indicating the first performance information, and transmitting the first update message to a location server.

BRIEF DESCRIPTION OF THE DRAWINGS

The same reference number represents the same element on all drawings.

DETAILED DESCRIPTION OF THE PREFERRED EMBODIMENT

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
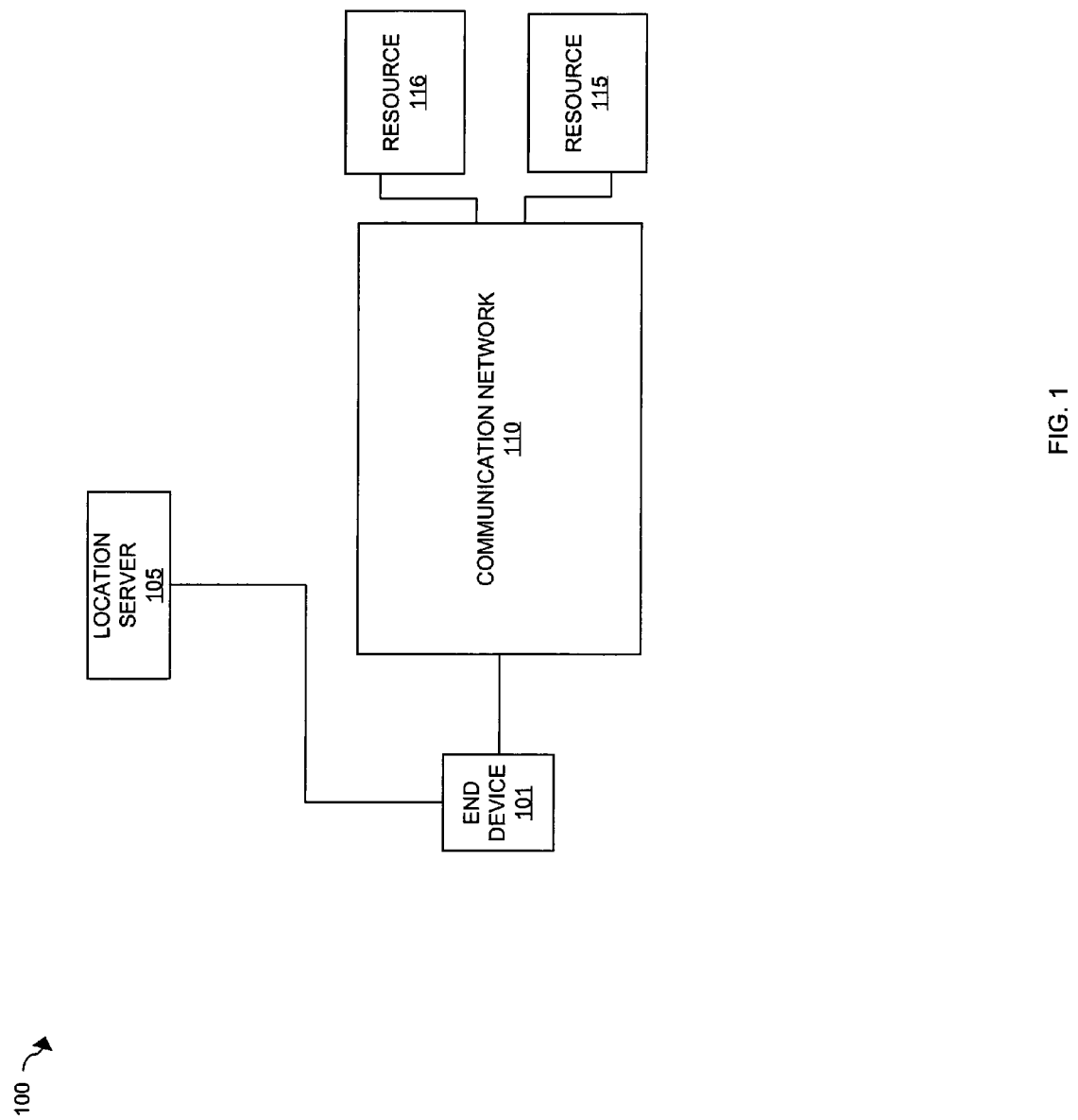
FIG. 1 illustrates a communication system in an embodiment of the invention.
Figure 2:
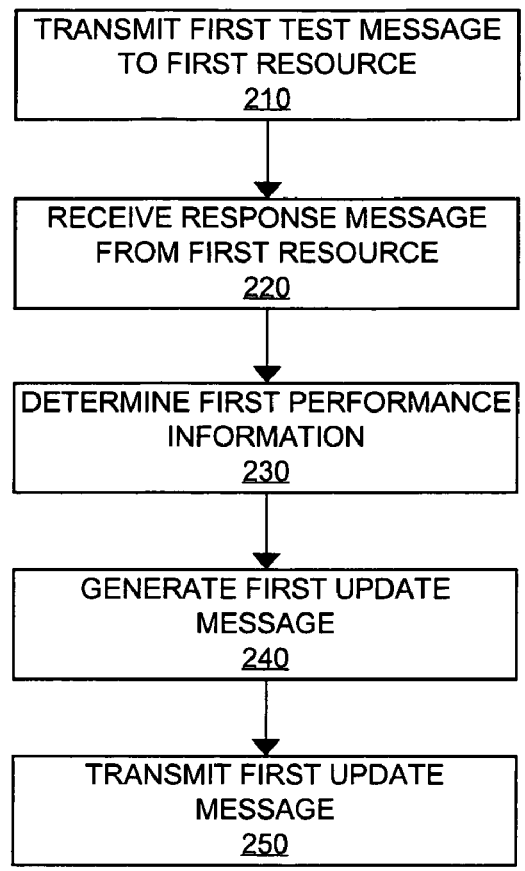
FIG. 2 illustrates the operation of a communication system in an embodiment of the invention.
Figure 3:
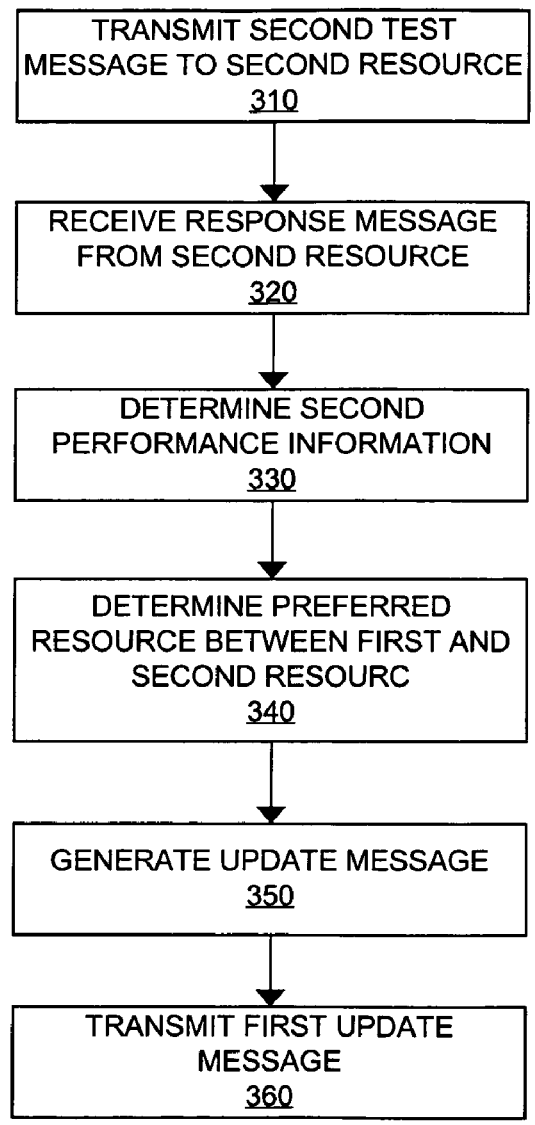
FIG. 3 illustrates the operation of a communication system in an embodiment of the invention.

First Embodiment Configuration and Operation—FIGS. 1-3

FIG. 1 illustrates communication system 100 in an embodiment of the invention. Communication system 100 includes communication network 100, end device 101, location server 105, resource 115, and resource 116. End device 101 is in communication with resources 115 and 116 over communication network 110. End device 101 is further in communication with location server 105 over communication network 110. Communication network 110 could be a single network as well as a group of interconnected networks. Communication system 100 could include other elements that are not shown for purposes of clarity.

In operation, a service session can be setup between end device 101 and either resource 115 or resource 116. The session could be, for example, a voice, video, music, or data session. Importantly, the session could be a real-time session requiring a high level of quality of service. Further in operation, end device 101 is capable of accessing resources 115 and 116 over various paths or by various access methods. Depending upon the path or access method, the quality of service delivered to end device 101 could vary. Rather than subjecting the end user to an unpredictable level of quality of service, it is preferable to determine the relative quality of service available over the various paths and access methods. In this manner, a preferred access can be selected and used to optimize service delivery.

FIG. 2 illustrates the operation of communication system 100 in an embodiment of the invention whereby the potential quality of service delivered to end device 101 by a resource is determined and a location server is updated with the quality of service information. To begin, end device 101 transmits a first test message to a first resource (Step 210). The first resource could be, for example, an application server such as application servers 115 and 116, as well as other types of network resources. A response is received by end device 101 from the first resource (Step 220). End device 101 determines first performance information based on the first test message and the first response (Step 230). For example, end device 101 can determine latency from the total round-trip time required to send the first test message and receive the first response. Other types of performance information are possible. Next, end device 101 generates first update message indicating the first performance information (Step 240) and transmits the update message to a location server for further processing (Step 250).

FIG. 3 illustrates the operation of communication system 100 in an embodiment of the invention whereby the potential quality of service delivered to end device 101 by multiple resources is determined and the preferred resource selected. The process illustrated in FIG. 3 could be considered cumulative to that illustrated in FIG. 2. To begin, end device 101 transmits a second test message to a second resource (Step 310). Next, end device 101 receives a response message from the resource responsive to the second test message (Step 320). Second performance information is determined based on the second response message (Step 330). The performance information for the second resource is processed with the performance information for the first resource to determine a preferred resource for the session (Step 340). End device 101 generates an update message indicating the preferred resource for the session (Step 350) and transmits the update message (350).

In an alternative, end device 101 could generate and transmit the performance information for the second resource in the update message rather than determining the preferred resource. In this case, the resource selection process could be executed by another network element, such as a location server.

Advantageously, communication network 100 allows for the provisioning and delivery of reliable and high quality services. For example, depending upon the location of end device 101, the path to each resource could change. For instance, if end device 101 first establishes a session with resource 115 over a first path, but then roams to a new location, the first path will change. For example, additional hops could be required between end device 101 and resource 115 as a result of having roamed. An implication of additional hops for a session could be a reduce quality of service due to an increased amount of latency created by the additional hops. Communication network 100 provides for testing the performance of links to other resources to determine a preferred resource for a session rather than remaining with the original resource for the duration of the session.

Second Embodiment Configuration and Operation—FIGS. 4-7

Figure 4:
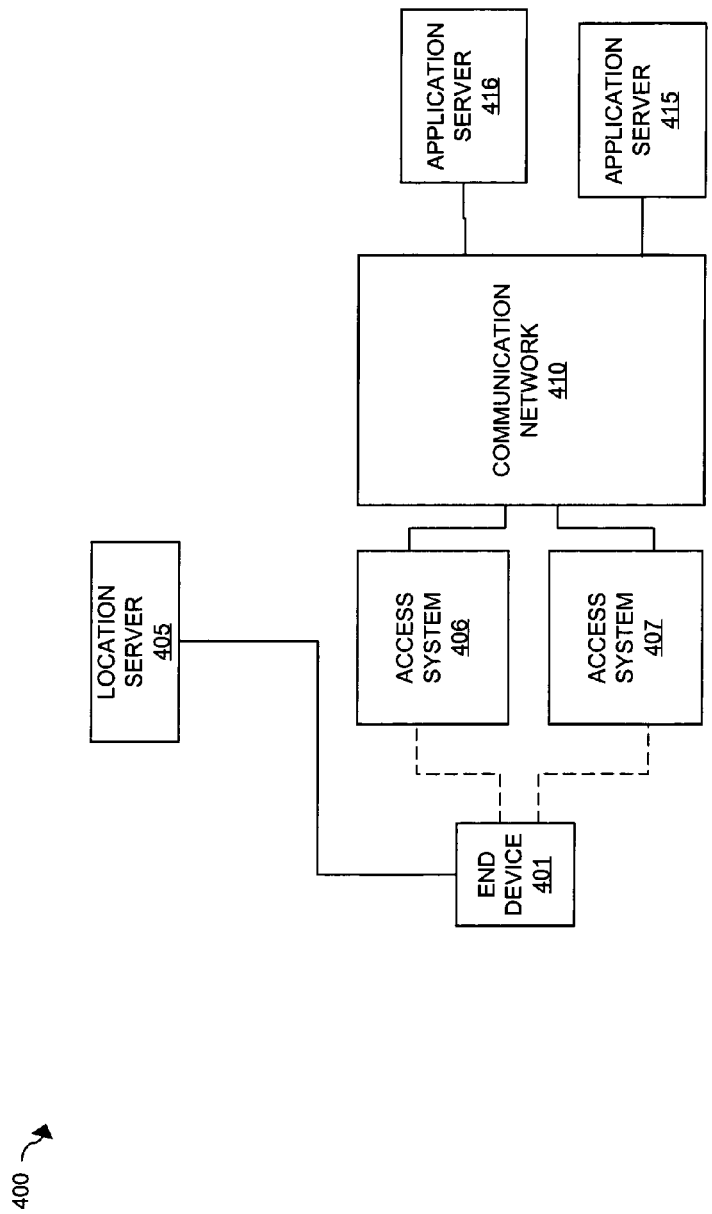
FIG. 4 illustrates a communication system in an embodiment of the invention.

FIG. 4 illustrates communication system 400 in an embodiment of the invention. Communication system 400 includes communication network 400, end device 401, location server 405, application server 415, and application server 416. End device 401 is in communication with application servers 415 and 416 over communication network 410. End device 401 is further in communication with location server 405 over communication network 410. End device 401 accesses communication network 410 through either access system 406 or access system 407. Communication network 410 could be a single network as well as a group of interconnected networks. Communication system 400 could include other elements that are not shown for purposes of clarity.

Application servers 415 and 416 could be any conventional application servers well known in the context of client-server applications. Examples of applications that could be run on application servers 415 and 416 include streaming video applications or file transfer applications, as well as other types of applications.

End device 401 could be any device capable hosting a client for interacting with an application on application servers 415 and 416. For instance, end device 401 could be a personal multi-media communication device, such as a phone, a personal digital assistant, or a personal music or video device, as well as other types of devices.

Location server 405 could be any control device capable of controlling application sessions between end device 401 and application servers 415 and 416. Location server 405 could be considered a stand alone element. Optionally, location server 405 could be considered an element within other control elements, such as soft switches.

Access system 406 could be any system capable of providing end device 401 with access to communication network 410. For example, access system 406 could be an access network, such as a mobile phone network, an Internet or intranet access network, a local area network, or a wide area network, as well as other types of access networks. End device 401 could communicate with access system 406 by various access methods corresponding to the characteristics of access system 406. For example, end device 401 could communicate with access system 406 using any conventional wireless protocol, such as WiFi, WiMax, CDMA, GSM, EvDO, or TDMA, as well as other protocols.

Access system 407 could also be any system capable of providing end device 401 with access to communication network 410. For example, access system 407 could be an access network, such as a mobile phone network, an Internet or intranet access network, a local area network, or a wide area network, as well as other types of access networks. End device 401 could communicate with access system 407 by various access methods corresponding to the characteristics of access system 407. For example, end device 401 could communicate with access system 407 using any conventional wireless protocol, such as WiFi, WiMax, CDMA, GSM, EvDO, or TDMA, as well as other protocols.

In operation, a service session can be setup between end device 401 and either application server 415 or application server 416. The session could be, for example, a video, music, or data session. Importantly, the session could be a real-time session requiring a high level of quality of service. Further in operation, end device 401 is capable of accessing application servers 415 and 416 by various access methods and over various access systems, such as access systems 406 and 407. However, considering that access systems 406 and 407 are each different from the other, the quality of service delivered to end device 401 for the service could vary depending upon the access system and access method.

Figure 5:
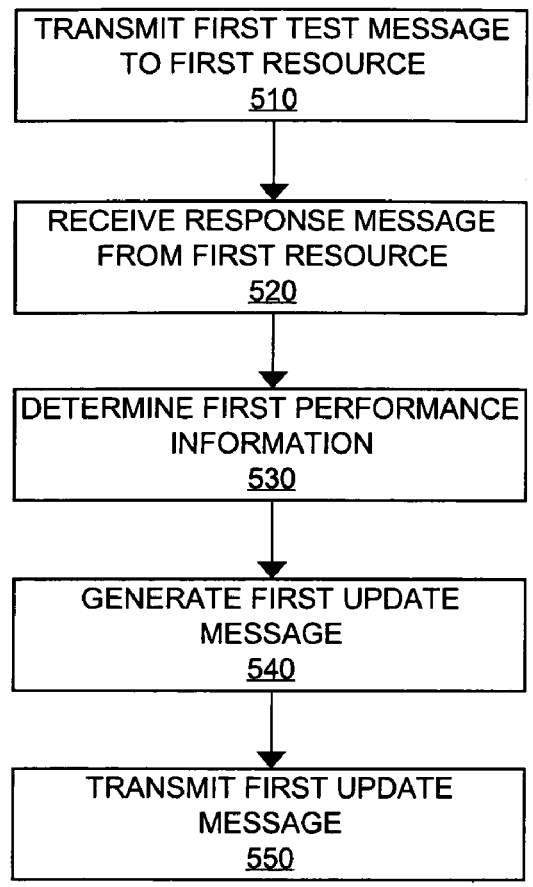
FIG. 5 illustrates the operation of a communication system in an embodiment of the invention.

FIG. 5 illustrates the operation of communication system 400 in an embodiment of the invention whereby the quality of service delivered to end device 401 by a resource is determined and a location server is updated with the quality of service information. In this embodiment, it is assumed that end device 401 is accessing the resource over only one of access system 406 or 407. To begin, end device 401 transmits a first test message to a first resource (Step 510). The first resource could be, for example, an application server such as application servers 415 and 416, as well as other types of network resources. A response is received by end device 401 from the first resource (Step 520). End device 401 determines first performance information based on the first test message and the first response (Step 530). For example, end device 401 can determine latency from the total round-trip time required to send the first test message and receive the first response. Other types of performance information are possible. Next, end device 401 generates first update message indicating the first performance information (Step 540) and transmits the update message to a location server for further processing (Step 550).

Figure 6:
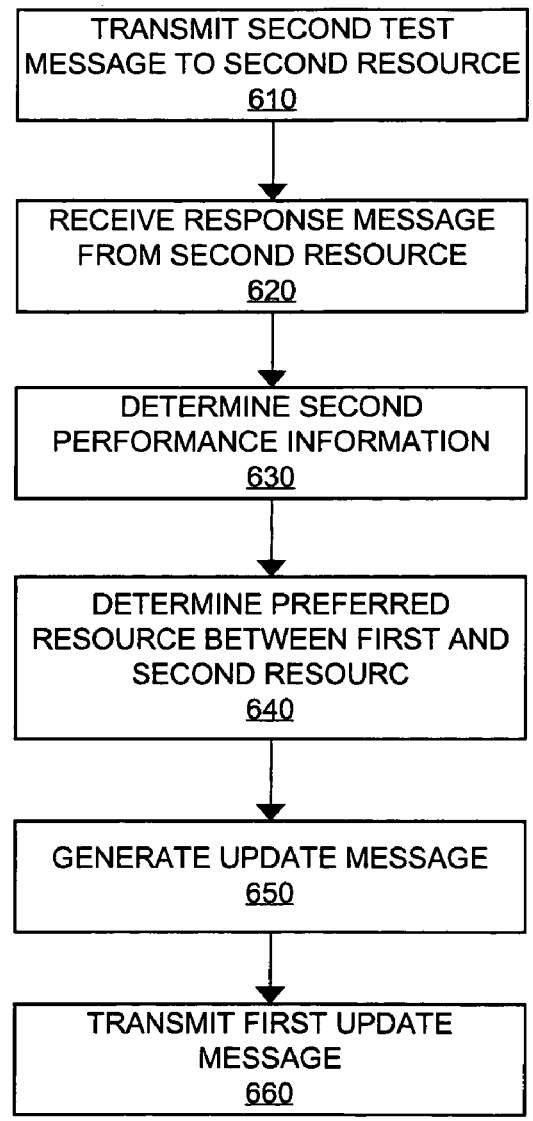
FIG. 6 illustrates the operation of a communication system in an embodiment of the invention.

FIG. 6 further illustrates the operation of communication system 400 in an embodiment of the invention whereby the potential quality of service delivered to end device 401 by multiple resources is determined and the preferred resource selected. The process illustrated in FIG. 6 could be considered cumulative to that illustrated in FIG. 5. In this embodiment, it is assumed that end device 401 is accessing the resource over the same access system, either access system 406 or 407, as in FIG. 5. To begin, end device 401 transmits a second test message to a second resource (Step 610). Next, end device 401 receives a response message from the resource responsive to the second test message (Step 620). Second performance information is determined based on the second response message (Step 630). The performance information for the second resource is processed with the performance information for the first resource to determine a preferred resource for the session (Step 640). End device 401 generates an update message indicating the preferred resource for the session (Step 650) and transmits the update message (650).

In an alternative, end device 401 could generate and transmit the performance information for the second resource in the update message rather than determining the preferred resource. In this case, the resource selection process could be executed by another network element, such as a location server.

Figure 7:
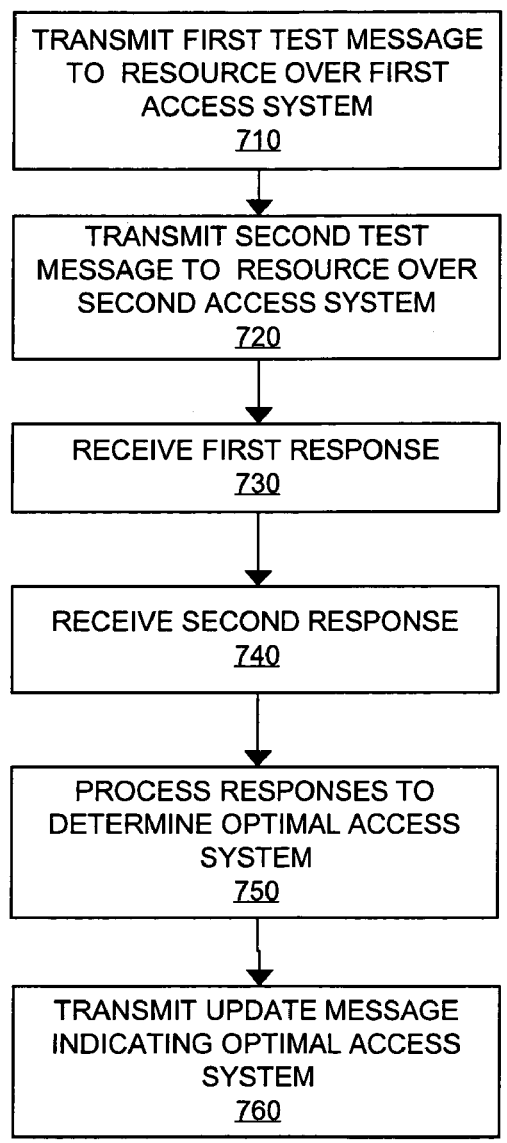
FIG. 7 illustrates the operation of a communication system in an embodiment of the invention.

FIG. 7 also illustrates the operation of communication system 400 in an embodiment of the invention whereby a preferred access system is determined based on the quality of service provided for a session between end device 401 and a resource, such as resources 415 and 416. To begin, end device 401 transmits a first test message to application server 415 over access system 406 (Step 710). Next, end device 401 transmits a second test message to application server 415 over access system 407 (Step 720). End device 401 receives a first test response messages from application server 415 over access system 406 (Step 730), and a second test response message over access system 407 (step 740). End device 401 processes the test responses, along with the original test messages, to determine the relative performance quality of access systems 406 and 407, and thus, the optimal access system for an application (Step 750). Based upon the performance quality, end device 401 generates and transmits an update message indicating the preferred access system of access system 406 and 407 for a particular service (Step 760).

It should be understood that a number of different protocols could be employed during the operation of communication network 400. End device 401 could use a number of different mechanisms for generating and transmitting test messages. In another example, end device 401 could run a TRIP-lite client for generating and transmitting update messages to location server 405. Likewise, location server 405 could be a TRIP server, also sometimes referred to as a TRIP speaker. Thus, location server 405 can receive update messages from end device 401 and update other location servers using TRIP functions.

Advantageously, communication network 400 allows for the provisioning and delivery of reliable and high quality services. For example, depending upon the location of end device 401, the path to each application server could change. For instance, if end device 401 first establishes a session with application server 415 over an access system, but then roams to a new access system, the path to application server 415 will change. For example, additional hops could be required between end device 401 and application server 415 as a result of having roamed. An implication of additional hops for a session could be a reduce quality of service due to an increased amount of latency created by the additional hops. Communication network 400 provides for testing the performance of links to other application servers, such as application server 416, to determine a preferred application server for a session rather than remaining with the original application server for the duration of the session. In another advantage, communication network 400 allows for selecting a preferred access method for conducting a service session between an end device and an application server.

Telecommunication Example

In one example, a user could user an end device, such as a mobile phone, to remotely use applications. The mobile phone could be a dual mode phone that is capable of operating in more than one mode, such as WiFi or CDMA. The modes could be distinguished by whether the wireless spectrum used for communications is licensed or unlicensed. For instance, WiFi is typically used for public Internet access over unlicensed spectrum. In contrast, CDMA networks utilize licensed portions of spectrum and could be considered a private access method. The applications the user desires to use could be any type of application. The applications are hosted on application servers, as is well known in the art.

Further in this example, the mobile phone could be a TRIP-lite enabled client. As discussed above, TRIP is a protocol used by elements called location servers to monitor the status of network gateways to provide enhanced routing services. A gateway typically runs a TRIP-lite client and updates a home location server regarding its status, such as whether or not the gateway is congested with network traffic. In turn, the home location server updates other location servers with the status of its home gateway. Location servers are usually responsible for managing sessions within a define service area. In this manner, all the location servers across a network will know the status of all the gateways, thereby improving routing decisions within and between service areas.

As oftentimes happens, the user may desire to roam from one service area to another. In addition, the user may encounter more than one access method within a particular service area. This results in several consequences. First, the user may be homed to a particular application server that provides a desired application to the user. As the user roams, the service connection between the mobile device and the application server may degrade as a result of increased distance, hops, or the like. Another consequence is that the service connection may degrade due to the access method. For instance, the CDMA network in one city may be congested compared to the CDMA network in another city. Similarly, one WiFi hot spot may provide a better connection than another hotspot. Lastly, the actual application server providing the application to the user may not be the best for the circumstances.

To provide reliable quality of service levels, the mobile phone, in concert with a location server, can determine performance characteristics for the various elements of the service session that effect the quality of the application provided to the user. For instance, path characteristics, such as the amount of time it takes a packet to complete a round-trip path between the mobile phone and the application server, can be determined. Such characteristics can be determined for the entire array of possible service paths. For example, a first path over a WiFi network to the application server can be tested. Nearly simultaneously, a second path over a CDMA network to the same application server can be tested. The results can be stored in the mobile device or uploaded to the location server.

It should be understood that such quality determinations could be made for a large array of applications, resources (such as application servers), and access methods. Consider a situation wherein a mobile device has access to two different access systems, systems A and B. Further consider that the user desires to use two applications A and B, and that each applications provided by two resources A and B respectively. The mobile device can test the performance characteristics of all the possible combinations of access systems and applications, as illustrated by the following table. The table could be stored by the mobile device for processing.

| APPLICATION | RESOURCE | ACCESS | PERFORMANCE |
|---|---|---|---|
| A | A | A | X |
| A | A | B | Z |
| B | B | A | Z |
| B | B | B | Y |

In this case, there are four possible combinations to test. First, application A can be provided by resource A over access system A. Second, application A can be provided by resource A over access system B. Third, application B can be provided by resource B over access system A. Fourth, and last, application B can be provided by resource B over access system B.

As illustrated by the table, a performance rating can be assigned to the results of all four combinations. For illustrative purposes only, a rating of X, Y, and Z is illustrated by FIG. 7, wherein X is the highest rating and Z is the lowest. As shown, the first combination provided the best quality of service, while the second and third combinations provided the worst. The fourth combination provided a middle level of quality of service.

Several actions can be taken in response to determining performance characteristics. The mobile device could send an update message to the location server indicating the quality of service levels of each combination. The location server would store the performance information and make session decisions based on the information. The location server could also update other location servers with the performance information. In this manner, it would be known across a network which combination of access system and application service is best for a particular user and application within a particular service area.

Another action that could be taken is that the mobile device could select the preferred combination based on the performance information. If application A takes priority over application B, the preferred combination would be the first combination using access system A. If application B takes priority over application A, then the preferred combination would be the fourth combination using access system B.

After having determined the preferred combination, the mobile device can update the location server with the preferred combination. The location server can store the preferred combination for later use. In addition, the location server can update other location servers. As the mobile device continues to roam and enters new service areas, the preferred combinations will be stored in all of the location servers. As a result, the quality of service delivered to the mobile phone for a particular application will be reliable.

Figure 8:
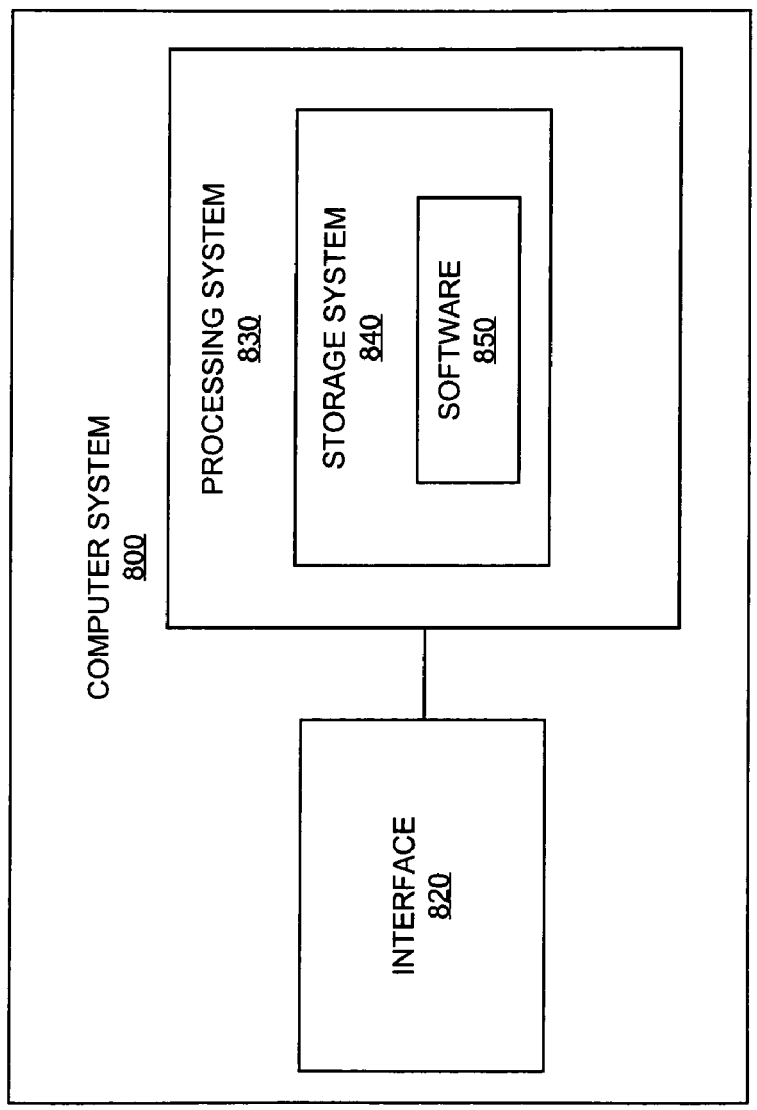
FIG. 8 illustrates a computer system in an embodiment of the invention.

Computer System—FIG. 8

FIG. 8 illustrates computer system 800 in an embodiment of the invention. Computer system 800 includes interface 820, processing system 830, storage system 840, and software 850. Storage system 840 stores software 850. Processing system 830 is linked to interface 820. Computer system 800 could be comprised of a programmed general-purpose computer, although those skilled in the art will appreciate that programmable or special purpose circuitry and equipment may be used. Computer system 800 may use a client server architecture where operations are distributed among a server system and client devices that together comprise elements 820-850.

Interface 820 could comprise a network interface card, modem, port, or some other communication device. Signaling interface 820 may be distributed among multiple communication devices. Interface 830 could comprise a computer microprocessor, logic circuit, or some other processing device. Processing system 830 may be distributed among multiple processing devices. Storage system 840 could comprise a disk, tape, integrated circuit, server, or some other memory device. Storage system 840 may be distributed among multiple memory devices.

Processing system 830 retrieves and executes software 850 from storage system 840. Software 850 may comprise an operating system, utilities, drivers, networking software, and other software typically loaded onto a general-purpose computer. Software 850 could also comprise an application program, firmware, or some other form of machine-readable processing instructions. When executed by the processing system 830, software 850 directs processing system 830 to operate as described for the elements of communication systems 100 and 400.

What is claimed is:

1. A communication system comprising:
an end device;
a location server; and
a plurality of resources each for providing individual instances of a first application;
wherein the end device is configured to transmit a first test message for the first application to a first resource of the plurality of resources using a first access method, receive a first response message from the first resource, process the first response message to determine first performance information indicating performance of the first access method and the first resource for the first application, generate a first update message indicating the first performance information, and transmit the first update message to the location server; and
wherein the end device is further configured transmit a second test message for the first application to a second resource of the plurality of resources using a second access method, receive a second response message from the second resource, process the second response message to determine second performance information indicating performance of the second access method and the second resource for the first application, generate a second update message indicating the second performance information, and transmit the second update message to the location server.

2. The communication system of claim 1 wherein the location server is configured to receive the first update message and update a performance table with the first performance information.

3. The communication system of claim 1 wherein the location server is configured to receive the second update message and update the performance table with the second performance information.

4. The communication system of claim 1 wherein the end device is further configured to transmit an application request indicating the first application to the location server and wherein the location server is configured to receive and process the first application request with the performance table to select a preferred access configuration.

5. The communication system of claim 4 wherein selecting the preferred access configuration comprises selecting a preferred resource of the plurality of resources and a preferred access method of the first and second access methods.

6. The communication system of claim 5 wherein the second access method comprises wireless Internet access.

7. The communication system of claim 1 wherein the first access method comprises code division multiple access (CDMA).

8. A method of operating a communication system, the method comprising:
transmitting a first test message for a first application using a first access method to a first resource of a plurality of resources each for providing individual instances of a first application;
receiving a first response message from the first resource;
processing the first response message to determine first performance information indicating performance of the first access method and the first resource for the first application;
generating a first update message indicating the first performance information;
transmitting the first update message to a location server;
transmitting a second test message for the first application to a second resource of the plurality of resources using a second access method;
receiving a second response message from the second resource;
processing the second response message to determine second performance information indicating performance of the second access method and the second resource for the first application;
generating a second update message indicating the second performance information; and
transmitting the second update message to the location server.

9. The method of claim 8 further comprising receiving the first update message and updating a performance table with the first performance information.

10. The method of claim 8 further comprising receiving the second update message and updating the performance table with the second performance information.

11. The method of claim 8 further comprising transmitting an application request indicating the first application, receiving and processing the first application request with the performance table to select a preferred access configuration.

12. The method of claim 11 wherein selecting the preferred access configuration comprises selecting a preferred resource of the plurality of resources and a preferred access method of the first and second access methods.

13. The method of claim 12 wherein the second access method comprises wireless Internet access.

14. The method of claim 8 wherein the first access method comprises code division multiple access (CDMA).

15. An end device in a communication network including the end device, a location server, and a plurality of resources each for providing individual instances of a first application, the end device comprising;
an interface configured to transmit a first test message for the first application to a first resource of the plurality of resources using a first access method, receive a first response message from the first resource, transmit a second test message for the first application to a second resource of the plurality of resources using a second access method, receive a second response message from the second resource;

a processing system configured to process the first response message to determine first performance information indicating performance of the first access method and the first resource for the first application and generate a first update message indicating the first performance information, process the second response message to determine second performance information indicating performance of the second access method and the second resource for the first application and generate a second update message indicating the second performance information;

the interface configured to transmit the first update message and the second update message to the location server.

16. A computer-readable medium having instructions thereon for operating a communication system including an end device, a location server, and a plurality of resources each for providing individual instances of a first application, wherein the instructions, when executed by the communication system, direct the communication system to:

transmit a first test message for the first application to a first resource of the plurality of resources using a first access method, receive a first response message from the first resource, process the first response message to determine first performance information indicating performance of the first access method and the first resource for the first application and generate a first update message indicating the first performance information, and transmit the first update message to the location server; and transmit a second test message for the first application to a second resource of the plurality of resources using a second access method, receive a second response message from the second resource, process the second response message to determine second performance information indicating performance of the second access method and the second resource for the first application and generate a second update message indicating the second performance information, and transmit the second update message to the location server.

* * * * *